United States Patent
Ishida et al.

(10) Patent No.: US 8,637,198 B2
(45) Date of Patent: Jan. 28, 2014

(54) REACTION CONTAINER AND FUEL CELL SYSTEM EQUIPPED WITH SAME

(75) Inventors: Nobuhisa Ishida, Kyoto (JP); Kouichi Sameshima, Kyoto (JP); Hiroko Ohmori, Kyoto (JP)

(73) Assignee: Konica Minolta Holdings, Inc., Tokyo (JP)

( * ) Notice: Subject to any disclaimer, the term of this patent is extended or adjusted under 35 U.S.C. 154(b) by 0 days.

(21) Appl. No.: 13/519,122

(22) PCT Filed: Dec. 10, 2010

(86) PCT No.: PCT/JP2010/072207
§ 371 (c)(1),
(2), (4) Date: Jun. 25, 2012

(87) PCT Pub. No.: WO2011/077969
PCT Pub. Date: Jun. 30, 2011

(65) Prior Publication Data
US 2012/0288775 A1  Nov. 15, 2012

(30) Foreign Application Priority Data
Dec. 24, 2009  (JP) .................................. 2009-292082

(51) Int. Cl.
*H01M 8/06* (2006.01)
(52) U.S. Cl.
USPC .......................................................... 429/421
(58) Field of Classification Search
None
See application file for complete search history.

(56) References Cited

U.S. PATENT DOCUMENTS

| | | | |
|---|---|---|---|
| 4,204,033 A | | 5/1980 | Meissner |
| 5,492,777 A | | 2/1996 | Jsenberg et al. |
| 5,650,051 A | * | 7/1997 | Wada et al. ............... 204/157.52 |
| 5,976,725 A | * | 11/1999 | Gamo et al. ................... 429/421 |
| 6,352,597 B1 | * | 3/2002 | Gutfleisch et al. ............. 148/101 |
| 6,447,945 B1 | * | 9/2002 | Streckert et al. .............. 429/421 |
| 6,530,233 B1 | * | 3/2003 | Nakamura et al. ............. 62/46.2 |
| 7,045,238 B2 | * | 5/2006 | Gottmann et al. ............. 429/418 |
| 7,083,874 B2 | * | 8/2006 | Sahoda ......................... 429/421 |
| 7,150,927 B2 | * | 12/2006 | Hickey et al. ................. 429/411 |
| 7,282,288 B2 | * | 10/2007 | Yoshizawa et al. ........... 429/414 |
| 7,295,723 B2 | * | 11/2007 | Hyde ............................... 385/12 |
| 2002/0106541 A1 | | 8/2002 | Yamada et al. |
| 2002/0155037 A1 | | 10/2002 | Otsuka et al. |
| 2008/0073127 A1 | * | 3/2008 | Zhan et al. ...................... 175/434 |
| 2008/0152971 A1 | * | 6/2008 | Jang et al. ......................... 429/19 |
| 2009/0020264 A1 | * | 1/2009 | Morita et al. ............. 165/104.12 |
| 2009/0258260 A1 | * | 10/2009 | Naganuma ....................... 429/17 |

FOREIGN PATENT DOCUMENTS

| | | |
|---|---|---|
| JP | 2000-32685 | 1/2000 |
| JP | 2002-151094 | 5/2002 |
| JP | 2003-227598 | 8/2003 |
| JP | 2004-067422 | 3/2004 |
| JP | 2004-149394 | 5/2004 |

(Continued)

*Primary Examiner* — Patrick Ryan
*Assistant Examiner* — Jose Colucci Rios
(74) *Attorney, Agent, or Firm* — Cozen O'Connor

(57) ABSTRACT

A fuel cell system (101) comprising a fuel cell (120) and a reaction container (103), wherein the fuel cell (120) comprises a fuel electrode (121), an air electrode (122) and an electrolyte film (123) and the reaction container (103) comprises a hydrogen storage material (106) and a heater (114) and can supply hydrogen to the fuel cell (120), and wherein a water flow path (109) for supplying water produced in the air electrode (122) to the reaction container (103) is provided.

24 Claims, 12 Drawing Sheets

(56) References Cited

FOREIGN PATENT DOCUMENTS

| | | |
|---|---|---|
| JP | 2004-327202 | 11/2004 |
| JP | 2005-255505 | 9/2005 |
| JP | 2005-289680 | 10/2005 |
| JP | 2005-336016 | 12/2005 |
| JP | 2006-179276 | 7/2006 |
| JP | 2008-121096 | 5/2008 |
| JP | 2009-99534 | 5/2009 |
| WO | WO 01/96233 | 12/2001 |
| WO | WO 2007/088923 | 8/2007 |

* cited by examiner

◁---- POWER GENERATION
◁──── CHARGING

POWER GENERATION

CHARGING

REACTION CONTAINER AND FUEL CELL SYSTEM EQUIPPED WITH SAME

This is a U.S. National Phase under 35 U.S.C. §371 of International Application No. PCT/JP2010/072207, filed on Dec. 10, 2010, and claims priority on Japanese Application No. 2009-292082, filed on Dec. 24, 2009, the entire content of which is hereby incorporated by reference.

TECHNICAL FIELD

The present invention relates to a reaction container that allows reactions of a fuel cell to be controlled and a fuel cell system equipped with the same.

BACKGROUND ART

In recent years, along with an improvement in performance of electronic equipment, there has been a growing demand for a cell having a larger capacity and a longer life. Conventional lithium-ion cells are limited in capacity since they have almost reached their theoretical limits of an energy density per volume and, therefore, can hardly be expected to achieve any further significant improvement in performance. With this being the situation, attention has been focused on a fuel cell that is significantly improved in energy density per volume compared with conventional cells and thus can achieve an increased capacity.

For example, Patent Document 1 proposes a regenerative fuel cell system. FIG. 11 is a schematic view showing a reaction mechanism of a fuel cell during power generation, and FIG. 12 is a schematic view showing a reaction mechanism of the fuel cell during charging. A fuel cell 520 described in Patent Document 1 is composed of a fuel electrode 521, an oxygen electrode 522, and an electrolyte membrane 523. At the time of power generation, upon supply of hydrogen to the fuel electrode 521, protons and electrons are generated from the hydrogen, and the protons move from the fuel electrode 521 through the electrolyte membrane 523 to the oxygen electrode 522. At the oxygen electrode 522, oxide ions generated from oxygen react with the protons that have moved thereto to generate water, and by these electrochemical reactions, motive power is generated. Furthermore, at the time of charging, upon application of voltages of opposite polarities to the fuel electrode 521 and to the oxygen electrode 522, respectively, reactions reverse to the reactions that occur during power generation occur at the fuel electrode 521 and at the oxygen electrode 522, respectively, so that hydrogen is generated at the fuel electrode 521, and oxygen is generated at the oxygen electrode 522. The fuel cell system described in Patent Document 1 performs charging by taking the hydrogen generated at the fuel electrode 521 into a hydrogen occlusion material and power generation by emitting the hydrogen thus taken thereinto.

LIST OF CITATIONS

Patent Literature

Patent Document 1: JP-A-2002-151094

SUMMARY OF THE INVENTION

Technical Problem

Generally speaking, however, the reaction of storing hydrogen in a hydrogen occlusion material and the reaction of emitting hydrogen therefrom are endothermic reactions that require a high temperature, and thus, in order for the reactions to progress, it is required to heat the hydrogen occlusion material so as to accelerate the reactions. To this end, some type of reaction adjustment mechanism should be provided in a reaction container in which the hydrogen occlusion material is housed. The fuel cell system described in Patent Document 1, however, has given no consideration to a reaction adjustment mechanism for this purpose and is, therefore, conceivably unable to perform charging and discharging in a continuously repeated manner.

In order to solve the above-described problem, it is an object of the present invention to provide a reaction container that, in a fuel cell system, allows reactions of starting and stopping charging and discharging to be controlled and the fuel cell system equipped with the reaction container.

Solution to the Problem

In order to achieve the above-described object, the present invention provides a reaction container that supplies hydrogen to a fuel cell including: a fuel electrode; an oxygen electrode; and an electrolyte membrane that is disposed between the fuel electrode and the oxygen electrode. The reaction container has a hydrogen occlusion material provided therein and is provided with at least one of a temperature adjustment mechanism and an internal pressure adjustment mechanism.

According to this configuration, an internal condition in the reaction container is adjusted by the temperature adjustment mechanism or the internal pressure adjustment mechanism, and thus conditions for starting and stopping reactions of the hydrogen occlusion material can be controlled. Thus, during power generation, hydrogen can be emitted stably from the hydrogen occlusion material, and during charging, hydrogen can be stored stably in the hydrogen occlusion material.

Furthermore, in the present invention, in the reaction container configured as above, the temperature adjustment mechanism includes at least one of a heater and a heat-insulated structure.

According to this configuration, the reactions of the hydrogen occlusion material can be controlled by adjusting heating by the heater. Furthermore, when the heat-insulated structure is used as the temperature adjustment mechanism, thermal efficiency of the reaction container as a whole can be increased.

Furthermore, in the present invention, in the reaction container configured as above, as the internal pressure adjustment mechanism, at least one of a valve mechanism and a pump is provided.

According to this configuration, the amount of a gas to be supplied that is intended to react with the hydrogen occlusion material and the discharge of products generated by the reactions of the hydrogen occlusion material can be adjusted by use of a valve or the pump.

Furthermore, in the present invention, in the reaction container configured as above, the hydrogen occlusion material is constituted by at least any one of iron, aluminum, and magnesium.

According to this configuration, in a case where the hydrogen occlusion material is constituted by iron, hydrogen can be emitted by utilizing an oxidation reaction between the iron and water, and hydrogen can be stored by reducing iron oxide resulting from the oxidation with hydrogen. Similarly, oxidation and reduction reactions of aluminum or magnesium also allow hydrogen emission and occlusion.

Furthermore, in the present invention, in the reaction container configured as above, the hydrogen occlusion material is prepared by being subjected to crushing so as to have an increased real surface area and then by forming minute cracks therein by hydrogen embrittlement, into which a sintering material is added by liquid phase deposition.

According to this configuration, reaction activity of the hydrogen occlusion material is enhanced, and thus hydrogen emission and occlusion can be performed stably. The above-described addition of a sintering material into any metallic hydrogen occlusion material can provide a similar effect.

Furthermore, in the present invention, in the reaction container configured as above, a water supply mechanism for supplying water to the reaction container is provided.

According to this configuration, water is supplied from the water supply mechanism to the reaction container, and thus the reaction between the hydrogen occlusion material and water can be accelerated.

Furthermore, in the present invention, in the reaction container configured as above, the water supply mechanism is provided with a valve mechanism.

According to this configuration, the amount of water to be supplied to the reaction container is adjusted by the valve mechanism, and thus the reaction between the hydrogen occlusion material and water can be controlled.

Furthermore, in the present invention, in the reaction container configured as above, water generated in the fuel cell is supplied to the reaction container via the water supply mechanism.

According to this configuration, water generated during electrochemical reactions of the fuel cell is removed, and thus the electrochemical reactions of the fuel cell can be accelerated. Furthermore, water generated in the fuel cell is used in the reaction container, and thus there is no need to newly provide a device for supplying water, thereby allowing size reduction of an apparatus as a whole.

Furthermore, in the present invention, in the reaction container configured as above, a water discharging mechanism for discharging water generated by a reaction of the hydrogen occlusion material is provided.

According to this configuration, water generated in the reaction of the hydrogen occlusion material is discharged from the water discharging mechanism, and thus the reaction of the hydrogen occlusion material can be accelerated.

Furthermore, in the present invention, in the reaction container configured as above, the water discharging mechanism utilizes a partial pressure difference of water vapor.

According to this configuration, water vapor generated by the reaction of the hydrogen occlusion material can be discharged efficiently from the reaction container.

Furthermore, in the present invention, in the reaction container configured as above, the water discharging mechanism discharges water generated by cooling of water vapor.

According to this configuration, since water vapor generated by the reaction of the hydrogen occlusion material is liquefied easily compared with other types of gases that build up in the reaction container, by utilizing this fact, water vapor can be discharged efficiently from the reaction container.

Furthermore, in the present invention, in the reaction container configured as above, the water discharging mechanism uses a water absorbent.

According to this configuration, by use of a water absorbent, water vapor can be discharged efficiently from the reaction container.

Furthermore, in the present invention, in the reaction container configured as above, the water discharging mechanism performs electrolysis of water and discharges oxygen by use of an oxygen permeable membrane.

According to this configuration, hydrogen can be generated from water vapor generated by the reaction of the hydrogen occlusion material, and thus a reaction of the hydrogen occlusion material can be accelerated.

Furthermore, in the present invention, in the reaction container configured as above, the hydrogen occlusion material is constituted by one of an organic hydride and a metal hydride.

According to this configuration, by use of an organic hydride or a metal hydride, hydrogen occlusion and emission can be performed efficiently.

Furthermore, in the present invention, in the reaction container configured as above, the hydrogen occlusion material is constituted by a complex hydride.

According to this configuration, by use of a complex hydride, hydrogen occlusion and emission can be performed efficiently.

Furthermore, in the present invention, in the reaction container configured as above, the hydrogen occlusion material is constituted by a carbon material.

According to this configuration, by use of a carbon material, hydrogen occlusion and emission can be performed efficiently. Examples of a carbon material include a carbon nanotube.

Furthermore, in the present invention, in the reaction container configured as above, a hydrogen supply mechanism for supplying hydrogen to the reaction container is provided.

According to this configuration, during charging, hydrogen is supplied from the hydrogen supply mechanism to the reaction container and can be stored in the reaction container.

Furthermore, in the present invention, in the reaction container configured as above, the hydrogen supply mechanism is provided with a valve mechanism.

According to this configuration, the amount of hydrogen to be supplied from the hydrogen supply mechanism to the reaction container is adjusted by use of a valve, and thus the amount of hydrogen to be stored in the reaction container can be controlled. Furthermore, during power generation by the fuel cell, hydrogen supply to the reaction container is stopped, and during charging of the fuel cell, the hydrogen supply to the reaction container is started, whereby power generation by and charging of the fuel cell can be controlled.

Furthermore, in the present invention, in the reaction container configured as above, the hydrogen supply mechanism is provided with a hydrogen separation membrane.

According to this configuration, only hydrogen can be supplied form the hydrogen supply mechanism to the reaction container.

Furthermore, in the present invention, in the reaction container configured as above, the hydrogen supply mechanism generates hydrogen by electrolysis of water.

According to this configuration, hydrogen can be generated easily from water, and thus a fuel for generating hydrogen can be obtained easily.

Furthermore, in the present invention, in the reaction container configured as above, the hydrogen supply mechanism generates hydrogen by a water decomposition reaction of a photocatalyst.

According to this configuration, hydrogen can be generated merely by irradiation with light and used to perform charging.

Furthermore, in the present invention, in the reaction container configured as above, surface plasmon resonance is used as an excitation source for the photocatalyst.

According to this configuration, a water decomposition reaction of a photocatalyst is further activated, and thus the generation of hydrogen can be accelerated.

Furthermore, in the present invention, as a material of the reaction container configured as above, any one of Si, glass, ceramic, metal, and plastic is used.

According to this configuration, a reaction container having excellent resistance to heat and pressure can be provided.

Furthermore, the present invention also provides a fuel cell system having the reaction container configured as above and the fuel cell. In the fuel cell system, the fuel cell is any one of a solid oxide fuel cell (SOFC), a polymer electrolyte fuel cell (PEFC), a phosphoric acid fuel cell (PAFC), and an alkaline fuel cell (AFC).

According to this configuration, a fuel cell system can be provided in which hydrogen storage in the reaction container and hydrogen supply to the reaction container are performed stably and that thus is continuously regenerative.

Furthermore, in the present invention, in the fuel cell system configured as above, in the fuel cell, when a negative voltage is applied to the fuel electrode and a positive voltage is applied to the oxygen electrode, reactions reverse to reactions that occur during power generation occur at the fuel electrode and at the oxygen electrode, respectively.

According to this configuration, hydrogen can be generated at the fuel cell by such reverse reactions of the fuel cell. The hydrogen thus generated is supplied to and stored in the reaction container, thereby allowing charging of the fuel cell to be performed.

Furthermore, in the present invention, the fuel cell system configured as above has a capacitor.

According to this configuration, electricity generated in the fuel cell can be charged in the capacitor. Furthermore, the capacitor can be used as a power source for the temperature adjustment mechanism, the internal pressure adjustment mechanism, and the hydrogen supply mechanism.

Furthermore, in the present invention, the fuel cell system configured as above has a lithium-ion cell.

According to this configuration, electricity generated in the fuel cell can be charged in the lithium-ion cell. Furthermore, the lithium-ion cell can be used as a power source for the temperature adjustment mechanism, the internal pressure adjustment mechanism, and the hydrogen supply mechanism.

Advantageous Effects of the Invention

According to the present invention, there can be provided a reaction container that is capable of controlling reactions of a reversible hydrogen occlusion material and a fuel cell system that supplies hydrogen to a fuel cell by use of the reaction container.

DESCRIPTION OF EMBODIMENTS

The following describes in detail a fuel cell system according to the present invention with reference to the appended drawings.

(First Embodiment)

Figure 1:
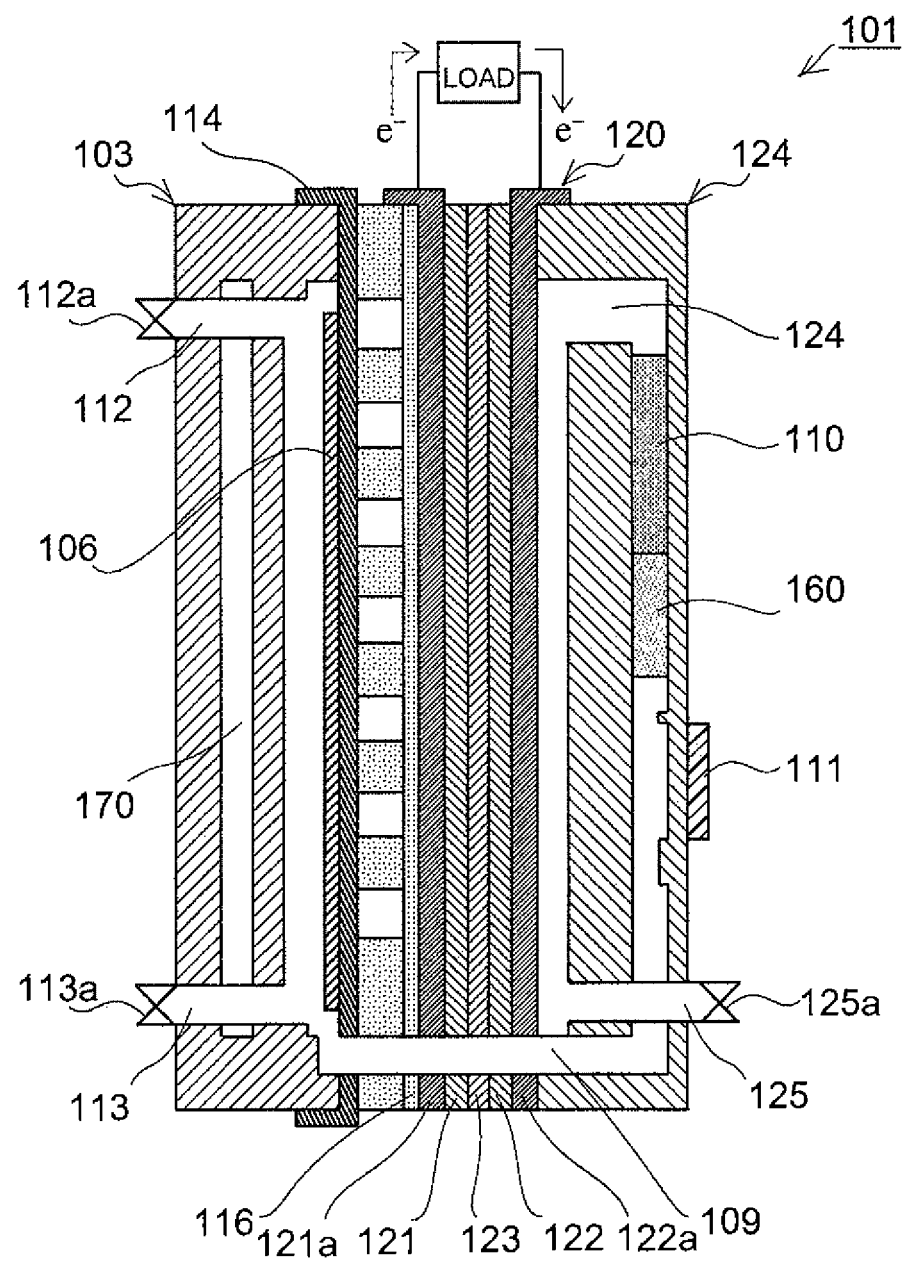
[FIG. 1] is schematic view showing part of a fuel cell system according to a first embodiment.

FIG. 1 is a schematic view showing part of a fuel cell system according to a first embodiment. A fuel cell system 101 includes a polymer electrolyte fuel cell 120 (hereinafter, abbreviated as PEFC), a reaction container 103, and an air chamber 124. The PEFC 120 is composed of a fuel electrode 121, an electrolyte membrane 123, and an oxygen electrode 122, with a fuel diffusion layer 121a formed on the fuel electrode 121 on the side of the reaction container 103 and an air diffusion layer 122a formed on the oxygen electrode 122 on the side of the air chamber 124. A first hydrogen separation membrane 116 is provided between the reaction container 103 and the fuel electrode 121, and inside the reaction container 103, as a hydrogen occlusion material 106, iron particles are provided at a predetermined position. Furthermore, the reaction container 103 adopts a two-tier structure in which a cavity 170 is provided between an outer wall and an inner wall and is provided with a heater 114 for heating the inside of the reaction container 103.

The reaction container 103 communicates with a hydrogen supply line 112, and hydrogen is supplied into the reaction container 103 via the hydrogen supply line 112. Furthermore, the reaction container 103 communicates with a water discharge line 113, and water is discharged out of the reaction container 103 via the water discharge line 113. The hydrogen supply line 112 and the water discharge line 113 are provided with a valve 112a and a valve 113a, respectively, and these valve mechanisms allow water supply into the reaction container 103 and water discharge out of the reaction container 103 to be controlled.

The air chamber 124, on the other hand, communicates with an oxygen supply line 125, and oxygen is supplied into the air chamber 124 via the oxygen supply line 125. Furthermore, the oxygen supply line 125 is provided with a valve 125a, and this allows air supply into the air chamber 124 to be controlled. Furthermore, the air chamber 124 and the reaction container 103 communicate with each other via a water flow path 109, and a gas-liquid separation filter 110 and a pump 111 are provided on the water flow path 109. Water generated at the oxygen electrode 122 is subjected to separation by the gas-liquid separation filter 110, and resulting water is supplied to the reaction container 103 via the pump 111. The water flow path 109, the gas-liquid separation filter 110, and the pump 111 represent one example of the "water supply mechanism" of the present invention.

The hydrogen occlusion material 106 is constituted by iron particles, and the following oxidation and reduction reactions occur in the reaction container 103.

Oxidation reaction: $3Fe+4H_2O \rightarrow Fe_3O_4+4H_2$
Reduction reaction: $Fe_3O_4+4H_2 \rightarrow 3Fe+4H_2O$ By these reactions, during power generation, the hydrogen occlusion material 106 emits hydrogen based on an oxidation reaction of iron, and during charging, it stores hydrogen based on a reduction reaction of iron oxide. Although the oxidation and reduction reactions of the hydrogen occlusion material 106 are endothermic reactions that require a high temperature, the heater 114 is used to adjust a temperature inside the reaction container 103, and thus the reactions of the hydrogen occlusion material 106 can be controlled. By use of the first hydrogen separation membrane 116 formed between the reaction container 103 and the fuel electrode 121, only hydrogen is separated from a gas containing water vapor and so on and then supplied to the fuel electrode 121.

In the PEFC 120, during power generation, the following reactions occur at the fuel electrode 121 and at the oxygen electrode 122, respectively, so that at the fuel electrode 121, protons and electrons are generated from hydrogen, and at the oxygen electrode 122, the protons that have moved thereto from the fuel electrode 121 and oxide ions generated from oxygen react with each other to generate water.

Fuel electrode: $H_2 \rightarrow 2H^+ + 2e^-$
Oxygen electrode: $4H^+ + O_2 + 4e^- \rightarrow 2H_2O$ Furthermore, upon application of voltages of opposite polarities to the fuel electrode 121 and the oxygen electrode 122, respectively, reactions reverse to the reactions that occur during power generation occur at the fuel electrode 121 and at the oxygen electrode 122, respectively.

Fuel electrode: $2H^+ + 2e^- \rightarrow H_2$
Oxygen electrode: $2H_2O \rightarrow 4H^+ + O_2 + 4e^-$ Next, the following describes a method of operation of the fuel cell system 101. At the time of power generation, the reaction container 103 is sealed by closing the valve 112a of the hydrogen supply line 112 and the valve 113a on the water discharge line 113, and the inside thereof is heated by the heater 114, so that in the reaction container 103, an oxidation reaction of iron constituting the hydrogen occlusion material 106 occurs to generate hydrogen. The hydrogen is then supplied through the first hydrogen separation membrane 116 to the fuel electrode 121.

Meanwhile, in the air chamber 124, oxygen is supplied to the oxygen electrode 122 by opening the valve 125a of the oxygen supply line 125, so that water is generated, and by these electrochemical reactions in the reaction container 103 and in the air chamber 124, the PEFC 120 generates power. Furthermore, water generated in the air chamber 124 is supplied into the reaction container 103 via the water flow path 109.

In a case of bringing the fuel cell system 101 to a halt, the reaction of the hydrogen occlusion material 106 is stopped by stopping the heating by the heater 114, and the oxygen supply is stopped by closing the valve 125a of the oxygen supply line 125, so that the electrochemical reactions of the PEFC 120 are stopped.

Furthermore, in a case of charging the fuel cell system 101, the valve 112a on the hydrogen supply line 112 and the valve 113a on the water discharge line 113 are opened, and the inside of the reaction container 103 is heated by the heater 114. This causes hydrogen supplied through the hydrogen supply line 112 into the reaction container 103 to reduce iron oxide and thus to be stored in the hydrogen occlusion material 106. Furthermore, in the reaction container 103, a water discharging mechanism is provided that is connected to the water discharge line 113, and thus water vapor generated in the reduction reaction of iron oxide is discharged thereby out of the reaction container 103, and thus the reduction reaction can be accelerated.

Figure 2:
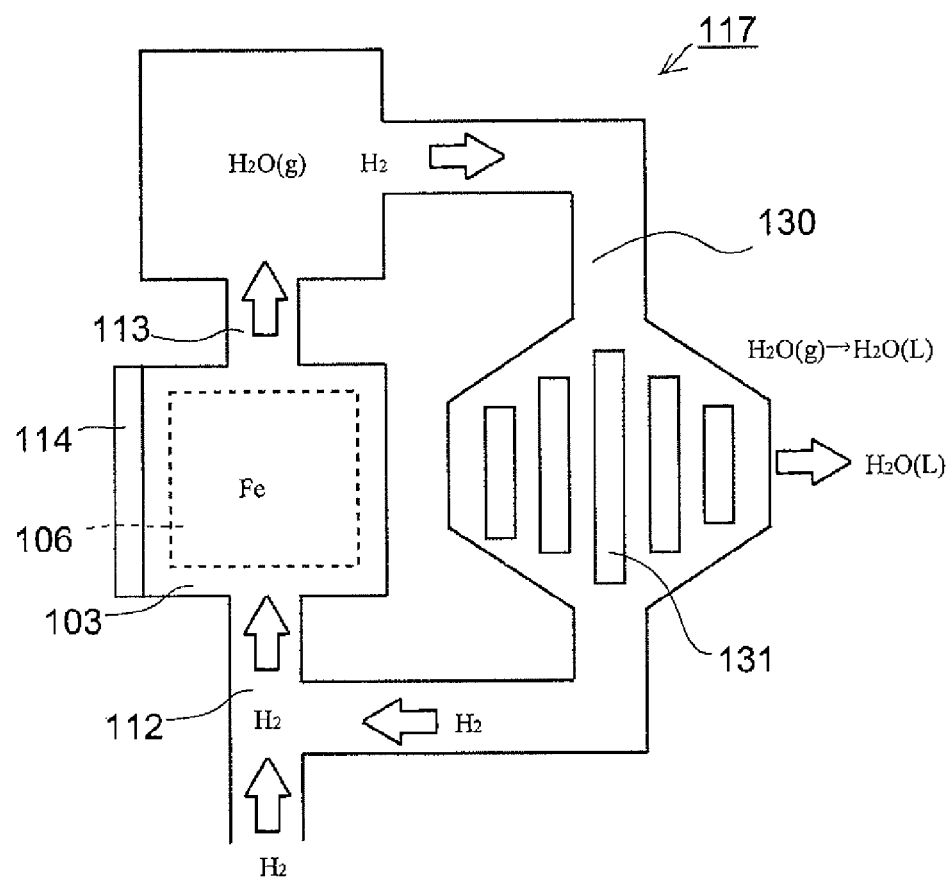
[FIG. 2] is a schematic view showing a water discharging mechanism.

FIG. 2 is a schematic view showing one example of the water discharging mechanism, and as shown in FIG. 2, a water discharging mechanism 117 is composed of a circulation path 130 and a cooling portion 131. The circulation path 130 communicates at one end with the water discharge line 113 and at the other end with the hydrogen supply line 112, and the cooling portion 131 is provided on the circulation path 130. Part of hydrogen supplied through the hydrogen supply line 112 into the reaction container 103 reacts with iron oxide constituting the hydrogen occlusion material 106 to generate water vapor, and the residual part of the hydrogen left without contributing to the reaction and the water vapor flow through the water discharge line 113 into the circulation path 130. The water vapor contained in a gas that has thus flowed thereinto is cooled to be liquefied and separated in the cooling portion 131. The hydrogen contained in the gas passes through the cooling portion 131 and flows through the hydrogen supply line 112 into the reaction container 103. As described above, the residual part of hydrogen left without reacting with the hydrogen occlusion material 106 circulates in the circulation path 130 and thus prevents a decrease in hydrogen concentration in the reaction container 103, so that the reduction reaction between the hydrogen occlusion material 106 and hydrogen is accelerated. A Peltier device can be used as the cooling portion 131, and providing the cooling portion 131 with a water-repellent structure allows liquefied water to be discharged efficiently.

Figure 3:
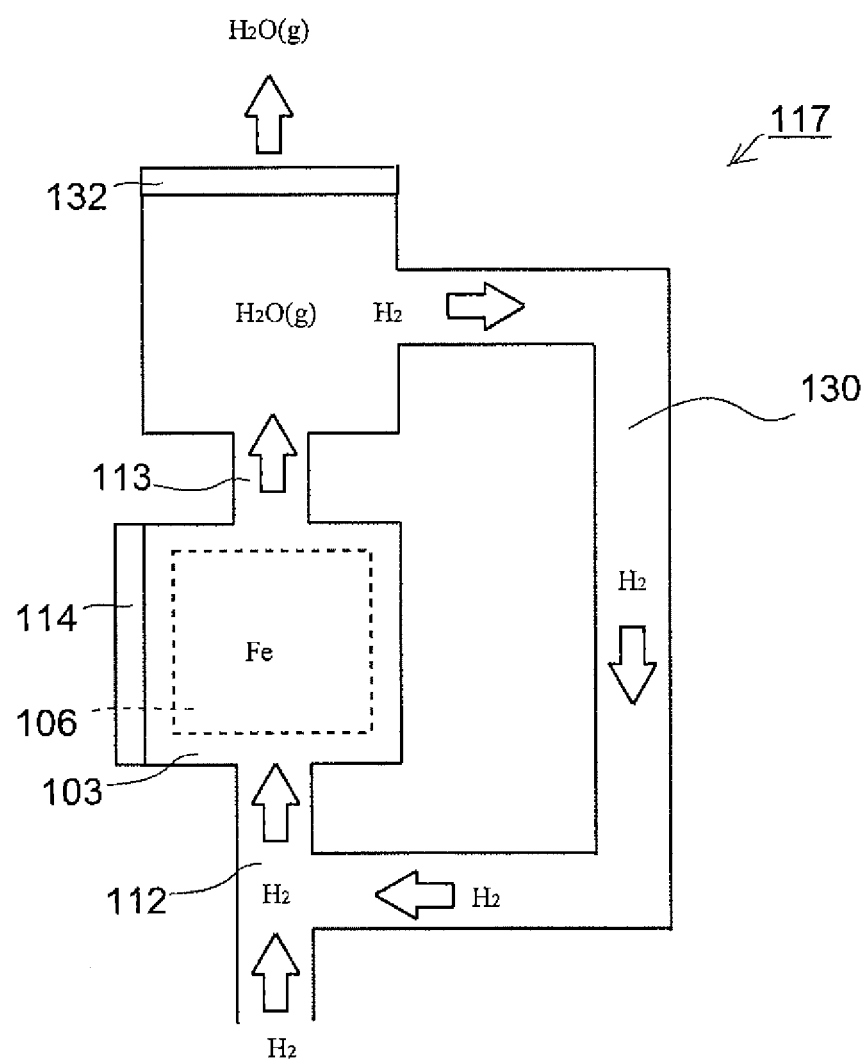
[FIG. 3] is a schematic view showing a water discharging mechanism.
Figure 4:
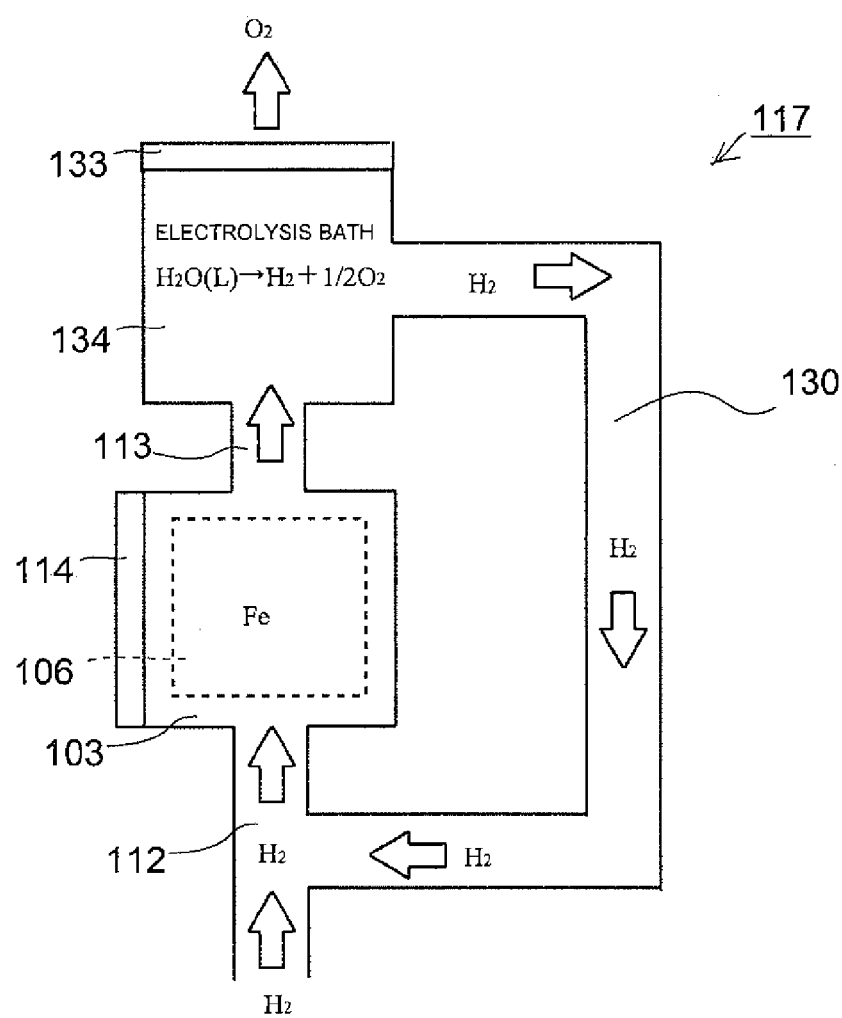
[FIG. 4] is a schematic view showing a water discharging mechanism.

FIG. 3 is a schematic view showing one example of the water discharging mechanism, and as shown in FIG. 3, a configuration is possible in which in the water discharging mechanism 117, a water vapor separation membrane 132 is provided at some point in the circulation path 130 so that water vapor is removed by use thereof. FIG. 4 is a schematic view showing one example of the water discharging mechanism, and as shown in FIG. 4, a configuration is possible in which an electrolysis bath 134 and an oxygen permeable membrane 133 are provided on the circulation path 130 so that circulating water vapor is separated into oxygen and hydrogen by electrolysis and thus is removed. At this time, the oxygen is eliminated by use of the oxygen permeable membrane 133, and the resulting hydrogen is made to flow again into the reaction container 103, so that the reduction reaction between the hydrogen occlusion material 106 and hydrogen can be accelerated. Furthermore, in addition to the above, a method utilizing a partial pressure difference of water vapor or a method using a water absorbent may be used to remove water vapor.

Although this embodiment uses the PEFC 120 as a fuel cell, any one of a solid oxide fuel cell (hereinafter, abbreviated as SOFC), a phosphoric acid fuel cell (hereinafter, abbreviated as PAFC), and an alkaline fuel cell (hereinafter, abbreviated as AFC) may be used as a fuel cell. In a case of using a fuel cell in which, during power generation, water is generated at the fuel electrode 121, such as an SOFC, it is not required that the air chamber 124 and the reaction container 103 communicate with each other by way of the water flow path 109.

As the hydrogen occlusion material 106, iron in the form of iron particles is used, which is prepared by being subjected to crushing so as to have an increased real surface area and then by forming minute cracks therein by hydrogen embrittlement, into which a sintering material is added by liquid phase deposition. By this treatment, reactivity of the oxidation and reduction reactions between iron and water is enhanced, and thus in the reaction container 103, hydrogen emission and occlusion are performed stably.

Furthermore, although this embodiment uses iron as the reversible hydrogen occlusion material 106, hydrogen occlusion materials of other types than iron can also be used to perform hydrogen emission and occlusion, and the use of aluminum or magnesium can bring about a similar reaction.

Furthermore, as a hydrogen occlusion material, an organic hydride or a metal hydride, a complex hydride, a carbon material, a hydrogen occlusion material based on a hydration reaction, and an alloy-based hydrogen occlusion material can also be used. Furthermore, as a material of the reaction container 103, any one of Si, glass, ceramic, metal, and plastic is used, and a material having excellent resistance to heat, chemicals, and pressure can be used favorably.

(Second Embodiment)

Figure 5:
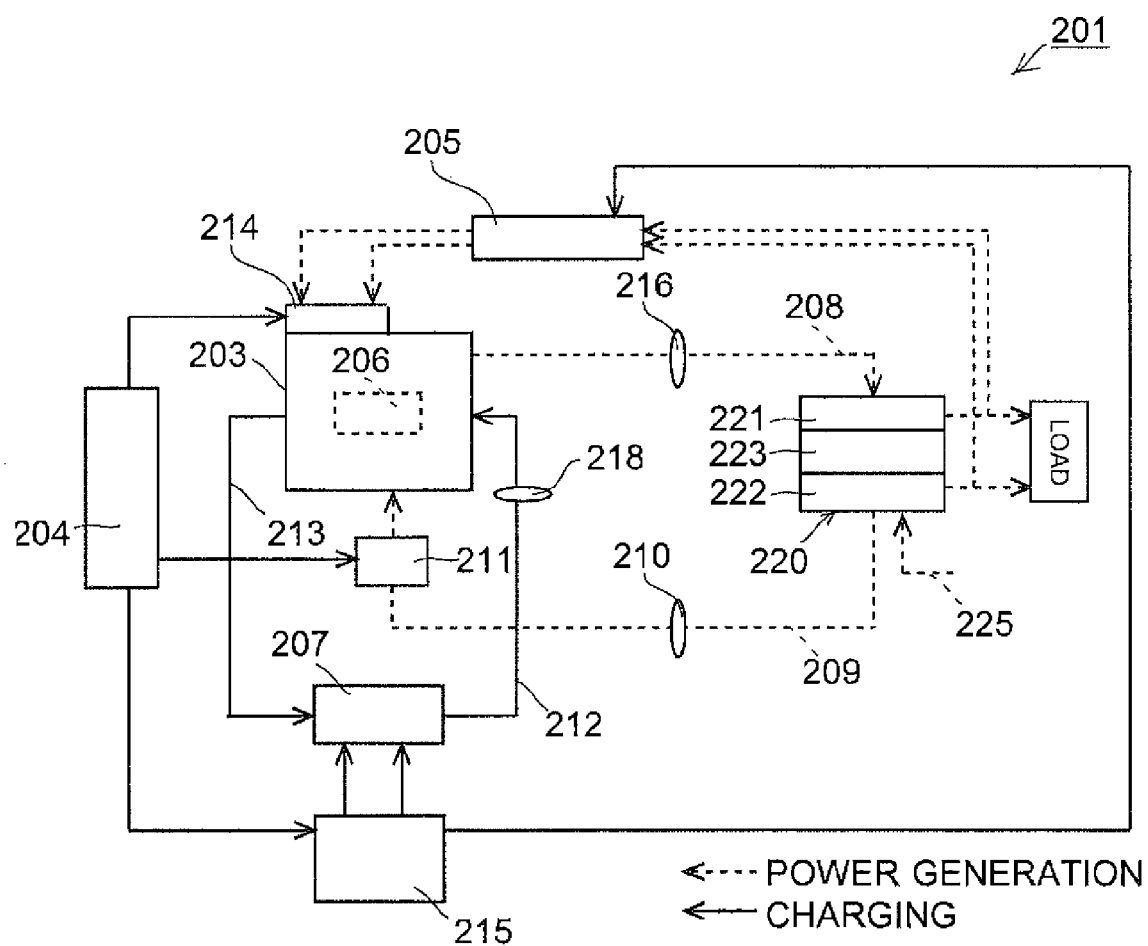
[FIG. 5] is a schematic structural view of a fuel cell system according to a second embodiment.
Figure 6:
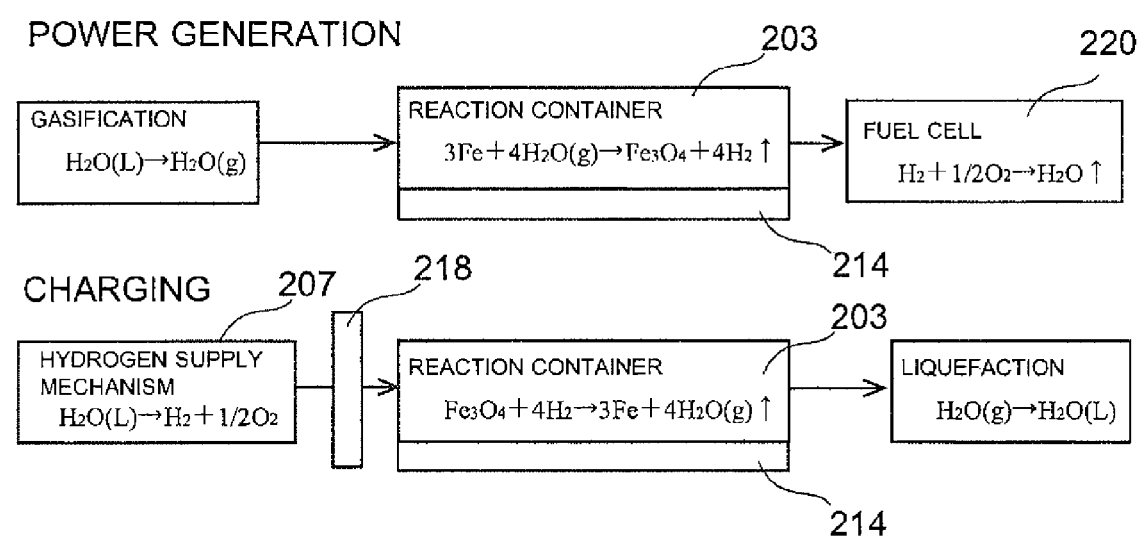
[FIG. 6] is a schematic view showing a reaction mechanism of the fuel cell system according to the second embodiment.

Next, the following describes a second embodiment of the fuel cell system according to the present invention with reference to the appended drawings. In the following, duplicate descriptions of components identical to those in the fuel cell system according to the first embodiment are omitted. FIG. 5 is a schematic structural view of a fuel cell system according to the second embodiment of the present invention, and FIG. 6 is a schematic view showing a reaction mechanism of the fuel cell system according to the second embodiment. A fuel cell system 201 includes a PEFC 220, a reaction container 203 that supplies hydrogen to the PEFC 220, a controller 204 that performs control of the entire fuel cell system 201, a capacitor 205, a charging power source 215, and a hydrogen supply mechanism 207 that, during charging, supplies hydrogen to the reaction container 203.

The reaction container 203 and the PEFC 220 communicate with each other by way of a hydrogen flow path 208 and a water flow path 209, and the hydrogen flow path 208 is connected to the side of a fuel electrode 221 of the PEFC 220, while the water flow path 209 is connected to the side of an oxygen electrode 222 of the PEFC 220. Furthermore, a first hydrogen separation membrane 216 is provided on the hydrogen flow path 208 and used to supply only hydrogen separated from a gas containing water vapor and so on to the fuel electrode 221. A gas-liquid separation filter 210 and a pump 211 are provided on the water flow path 209. Water vapor generated at the oxygen electrode 222 is liquefied, after which only water is separated from the water vapor thus liquefied by the gas-liquid separation filter 210, and water vapor obtained by gasifying the water by use of a gasifier is supplied to the reaction container 303. Furthermore, an oxygen supply line 225 is connected to the side of the oxygen electrode 222.

The reaction container 203 and the hydrogen supply mechanism 207 communicate with each other by way of a hydrogen supply line 212 and a water discharge line 213, and a second hydrogen separation membrane 218 is provided on the hydrogen supply line 212. By use of the second hydrogen separation membrane 218, only hydrogen is supplied from the hydrogen supply mechanism 207 to the reaction container 203 via the hydrogen supply line 212, and water inside the reaction container 203 is supplied to the hydrogen supply mechanism 207 via the water discharge line 213.

Furthermore, the hydrogen supply line 212, the water discharge line 213, and the oxygen supply line 225 are each provided with a valve (not shown), and these valve mechanisms allow hydrogen supply into the reaction container 203, water discharge out of the reaction container 203, and oxygen supply to the oxygen electrode 222 to be controlled.

A heater 214 adjusts a temperature inside the reaction container 203 so as to control reactions of a hydrogen occlusion material 206. The capacitor 305 is used to provide an external voltage for the heater 214. Furthermore, the capacitor 205 is connected to the charging power source 215 and to the PEFC 220, and part of electricity generated in the PEFC 220 is stored therein. As the charging power source 215, a lithium-ion cell can be used.

The controller 204 is connected to the heater 214, to the charging power source 215, to the pump 211, and to, though not shown, each of the valves on the hydrogen supply line 212, the water discharge line 213, and the oxygen supply line 225 and controls an adjustment of heating by the heater 214, driving of the hydrogen supply mechanism 207 by the charging power source 215, and opening and closing of the valves. Specifically, at the time of power generation, the reaction container 203 is sealed by closing the valve on the hydrogen supply line 212 and the valve on the water discharge line 213, and the inside thereof is heated by the heater 214, so that an oxidation reaction of iron constituting the hydrogen occlusion material 206 is caused to generate hydrogen. At this time, only hydrogen that has permeated through the first hydrogen separation membrane 216 provided on the hydrogen flow path 208 is supplied to the fuel electrode 221. Furthermore, at the oxygen electrode 222, oxygen is supplied thereto by opening the valve of the oxygen supply line 225, and by electrochemical reactions at the fuel electrode 221 and at the oxygen electrode 222, the PEFC 220 generates power. Furthermore, by the pump 211, water generated at the oxygen electrode 222 is conveyed through the water flow path 209 to the reaction container 203.

At the time of stopping the power generation, the heating by the heater 214 is stopped, and the oxygen supply to the oxygen electrode 222 is stopped by closing the valve on the oxygen supply line 225, so that the electrochemical reactions of the PEFC 220 are stopped.

Furthermore, at the time of charging, with the valve on the hydrogen supply line 212 and the valve on the water discharge line 213 opened, the inside of the reaction container 203 is heated by the heater 214, and a voltage is applied from the charging power source 215 to the hydrogen supply mechanism 207. This causes hydrogen generated in the hydrogen supply mechanism 207 to be supplied into the reaction container 203 via the hydrogen supply line 212, and the hydrogen occlusion material 206 then occludes the hydrogen. These mechanisms of adjusting a temperature and an internal pressure in the reaction container 203 are controlled by the controller 204, and thus hydrogen emission and storage by the reversible hydrogen occlusion material 206 are performed stably, thereby allowing charging and discharging of the PEFC 220 to be controlled.

In the above-described fuel cell system 201, the oxidation reaction between iron and water that occurs in the reaction container 203 during power generation uses water generated at the oxygen electrode 222 during power generation by the PEFC 220. By discharging water generated at the oxygen electrode 222 during power generation in this manner, the electrochemical reaction that occurs at the oxygen electrode 222 during power generation is prevented from being impaired, and the oxidation reaction between iron and water in the reaction container 203 can be accelerated.

Furthermore, during charging, water generated in the reaction container 203 is discharged actively through the water discharge line 213, and thus the reduction reaction that occurs in the reaction container 203 is accelerated, so that the reaction can be made to progress even in a case where a temperature in the reaction container 203 is relatively low. At this time, the water discharging mechanism described with regard to the first embodiment can be used to eliminate water through the water discharge line 213. Furthermore, the hydrogen supply mechanism 207 is a mechanism that generates hydrogen by electrolysis of water, and as water to be subjected to the electrolysis, water generated in the reaction container 203 during charging is used and supplied from the reaction container 203 to the hydrogen supply mechanism 207 via the water discharge line 213. As a power source used for the electrolysis, the charging power source 215 is used.

Furthermore, the hydrogen supply mechanism 207 according to the present invention is not limited to the mechanism utilizing electrolysis of water and may utilize a water decomposition reaction of a photocatalyst. Since in a water decomposition reaction of a photocatalyst, hydrogen can be generated by irradiating the photocatalyst with natural light, there is no need to connect the hydrogen supply mechanism 207 to the charging power source 215. The use of surface plasmon resonance as an excitation source for the photocatalyst is preferable in that it activates a water decomposition reaction of a photocatalyst and thus can accelerate the generation of hydrogen.

(Third Embodiment)

Figure 7:
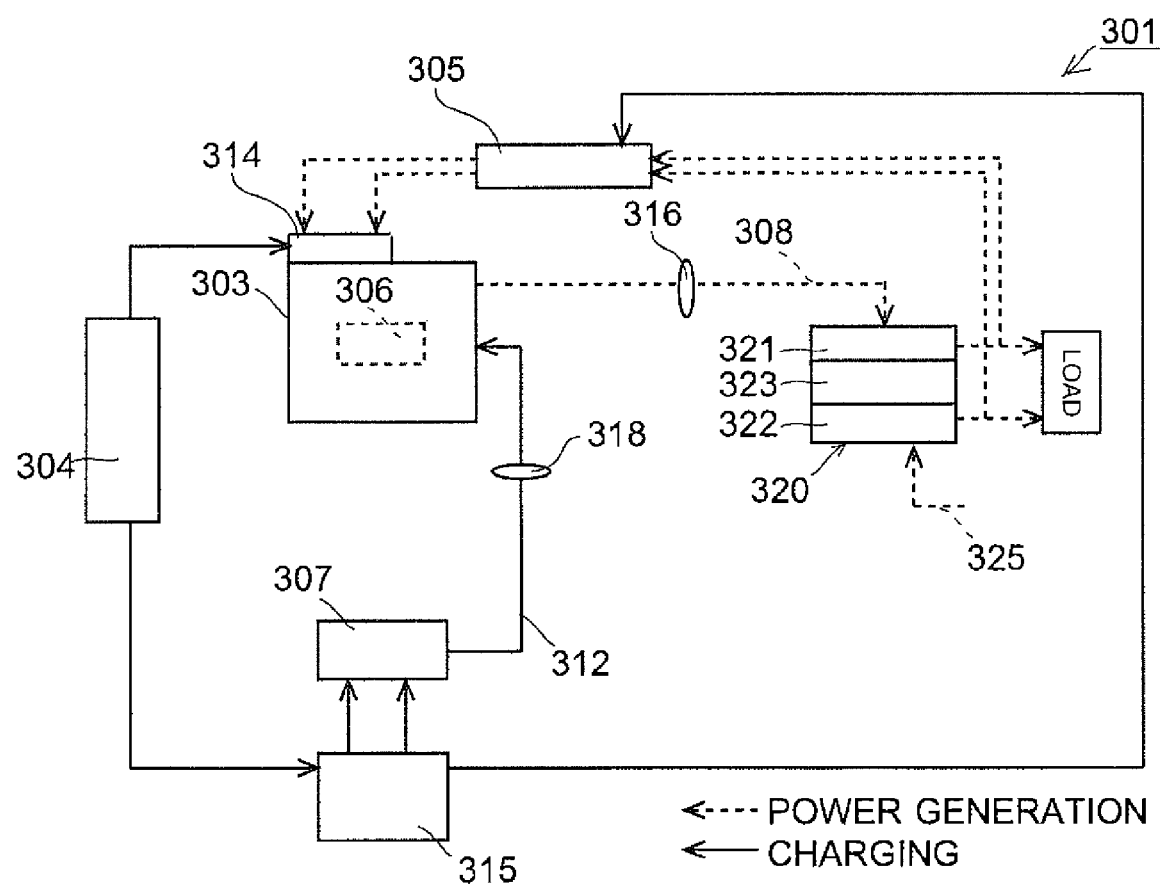
[FIG. 7] is a schematic structural view of a fuel cell system according to a third embodiment.
Figure 8:
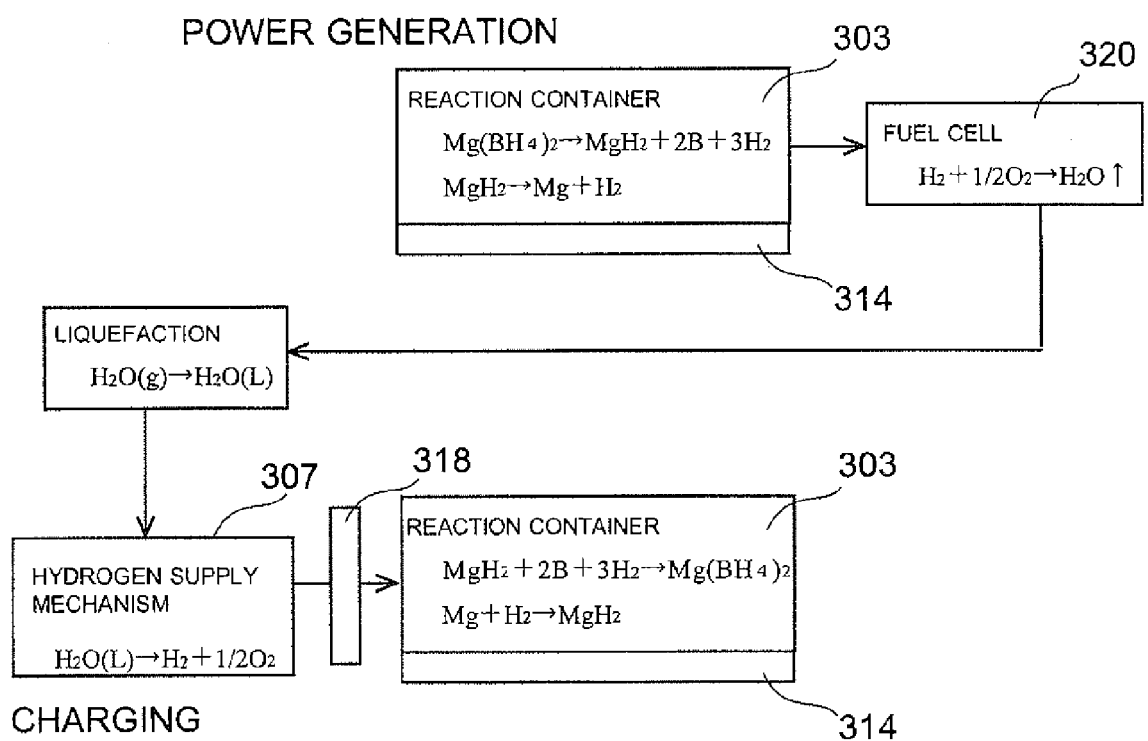
[FIG. 8] is a schematic view showing a reaction mechanism of the fuel cell system according to the third embodiment.

Next, the following describes a third embodiment of the fuel cell system according to the present invention with reference to the appended drawings. In the following, duplicate descriptions of components identical to those in the fuel cell systems according to the first and second embodiments are omitted. FIG. 7 is a schematic structural view of a fuel cell system according to the third embodiment of the present invention, and FIG. 8 is a schematic view showing a reaction mechanism of the fuel cell system according to the third embodiment. A fuel cell system 301 includes a PEFC 320, a reaction container 303, a controller 304, a capacitor 305, a charging power source 315, and a hydrogen supply mechanism 307.

The reaction container 303 and the PEFC 320 communicate with each other by way of a hydrogen flow path 308 that is connected to the side of a fuel electrode 321, and a first hydrogen separation membrane 316 is provided on the hydrogen flow path 308. Furthermore, an oxygen supply line 325 is connected to the side of an oxygen electrode 322.

The reaction container 303 and the hydrogen supply mechanism 307 communicate with each other by way of a hydrogen supply line 312, and a second hydrogen separation membrane 318 is provided on the hydrogen supply line 312. By use thereof, only hydrogen is supplied from the hydrogen supply mechanism 307 into the reaction container 303. On each of the hydrogen supply line 312 and the oxygen supply line 325, a valve (not shown) is provided, and these valve mechanisms allow hydrogen supply into the reaction container 303 and oxygen supply to the oxygen electrode 322 to be controlled.

Inside the reaction container 303, as a reversible hydrogen occlusion material 306, a complex hydride, $Mg(BH_4)_2$, is provided, which emits hydrogen during power generation and stores hydrogen during charging based on the following reactions.

During power generation: $Mg(BH_4)_2 \rightarrow MgH_2 + 2B + 3H_2$: $MgH_2 \rightarrow Mg + H_2$ During charging: $MgH_2 + 2B + 3H_2 \rightarrow Mg(BH_4)_2$: $Mg + H_2 \rightarrow MgH_2$ Since these reactions of hydrogen emission and hydrogen occlusion are endothermic reactions that require a relatively high temperature, a temperature adjustment mechanism for heating the inside of the reaction container 303 to a high temperature is required, and to that end, the reaction container 303 is provided with a heater 314. The capacitor 305 is used to provide an external voltage for the heater 314. The capacitor 305 is connected to the charging power source 315 and to the PEFC 320, and part of electricity generated in the PEFC 320 is stored in the capacitor 305.

The controller 304 is connected to the heater 314, to the charging power source 315, and to, though not shown, each of the valves on the hydrogen supply line 312 and the oxygen supply line 325 and controls an adjustment of heating by the heater 314, driving of the hydrogen supply mechanism 307 by the charging power source 315, and opening and closing of the valves. Specifically, at the time of power generation, the reaction container 303 is sealed by closing the valve on the hydrogen supply line 312, and the inside thereof is heated by the heater 314, so that a reaction of the hydrogen occlusion material 306 is caused to generate hydrogen. At this time, only hydrogen that has permeated through the first hydrogen separation membrane 316 provided on the hydrogen flow path 308 is supplied to the fuel electrode 321. Furthermore, at the oxygen electrode 322, oxygen is supplied thereto by opening the valve of the oxygen supply line 325, and by electrochemical reactions at the fuel electrode 321 and at the oxygen electrode 322, the PEFC 320 generates power.

At the time of stopping the power generation, the heating by the heater 314 is stopped, and the oxygen supply to the oxygen electrode 322 is stopped by closing the valve on the oxygen supply line 325, so that the electrochemical reactions of the PEFC 320 are stopped.

Furthermore, at the time of charging, with the valve on the hydrogen supply line 312 opened, the inside of the reaction container 303 is heated by the heater 314, and a voltage is applied from the charging power source 315 to the hydrogen supply mechanism 307. This causes hydrogen generated in the hydrogen supply mechanism 307 to be supplied into the reaction container 303 via the hydrogen supply line 312, and the hydrogen occlusion material 306 then occludes the hydrogen. These mechanisms of adjusting a temperature and an internal pressure in the reaction container 303 are controlled by the controller 304, and thus hydrogen emission and storage by the reversible hydrogen occlusion material 306 are performed stably, thereby allowing charging and discharging of the PEFC 320 to be controlled.

In the fuel cell system 301, as shown in FIG. 8, the following is also possible. That is, water vapor generated at the oxygen electrode 322 during power generation is stored in a liquefied state so as to be used in the hydrogen supply mechanism 307 during charging. By discharging water generated at the oxygen electrode 322 during power generation in this manner, the electrochemical reaction that occurs at the oxygen electrode 322 during power generation can be prevented from being impaired, and water to be used for the hydrogen supply mechanism 307 can be secured in the fuel cell system 301.

(Fourth Embodiment)

Figure 9:
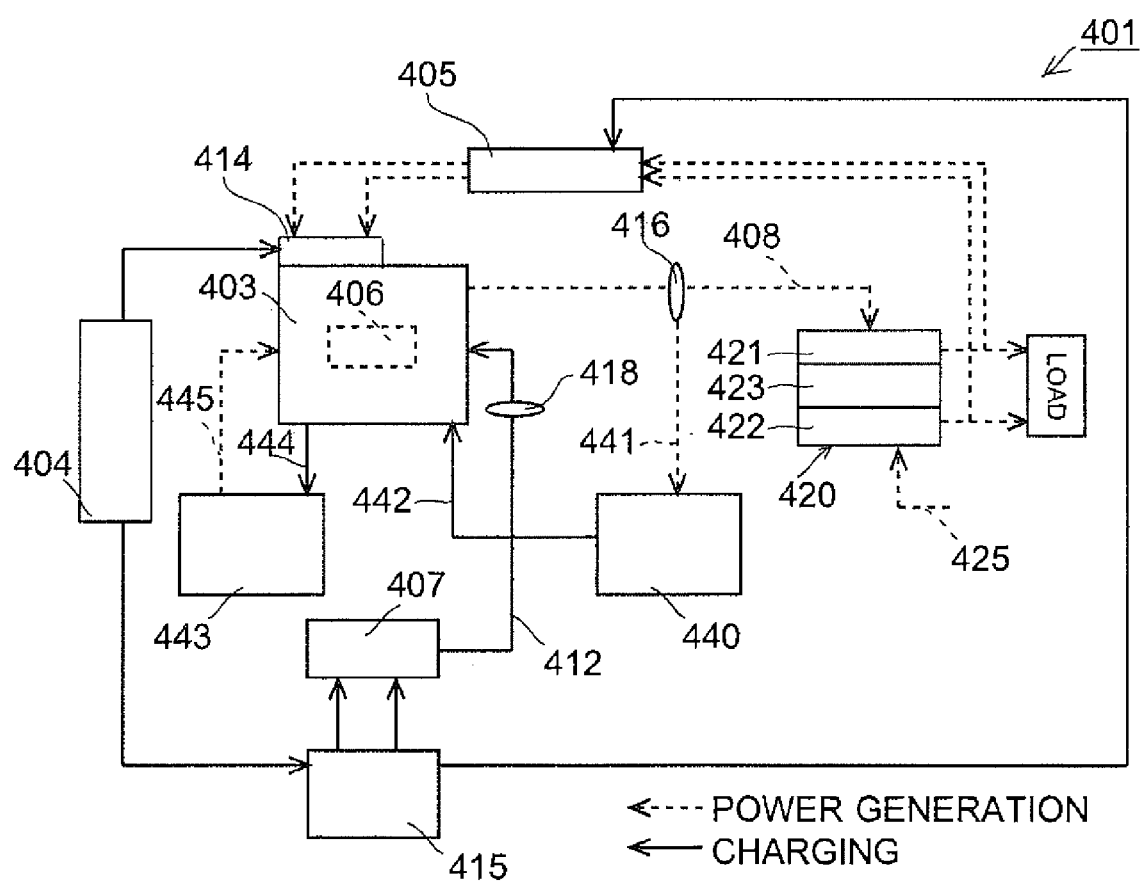
[FIG. 9] is a schematic structural view of a fuel cell system according to a fourth embodiment.
Figure 10:
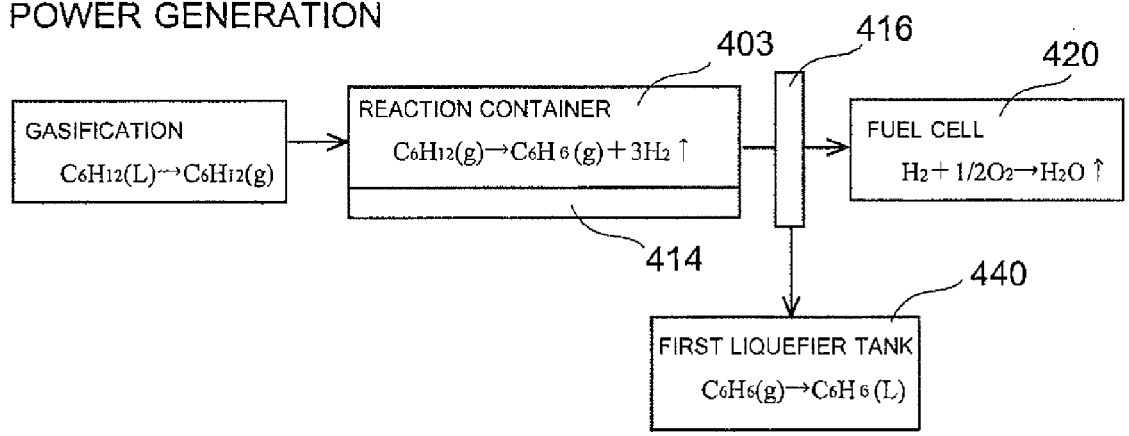
[FIG. 10] is a schematic view showing a reaction mechanism of the fuel cell system according to the fourth embodiment.
Figure 10:
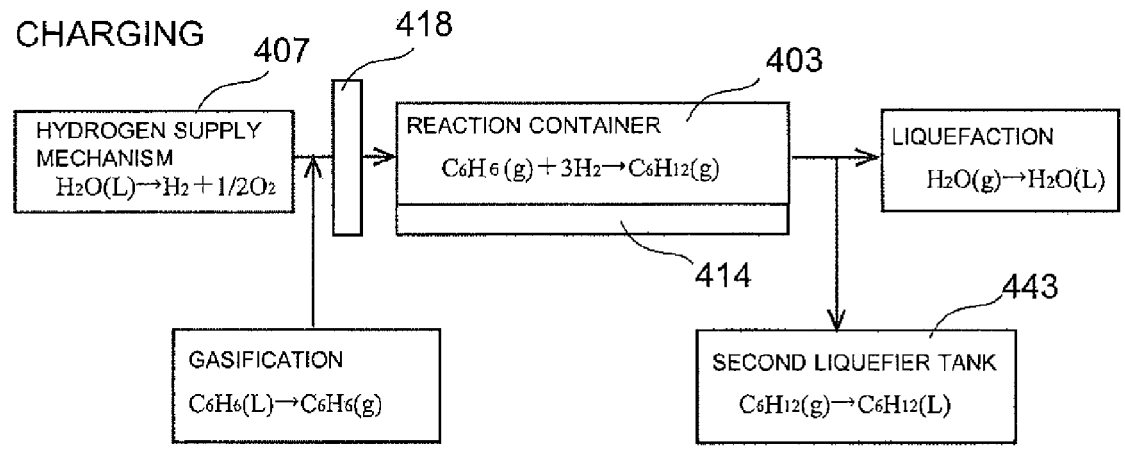
Figure 11:
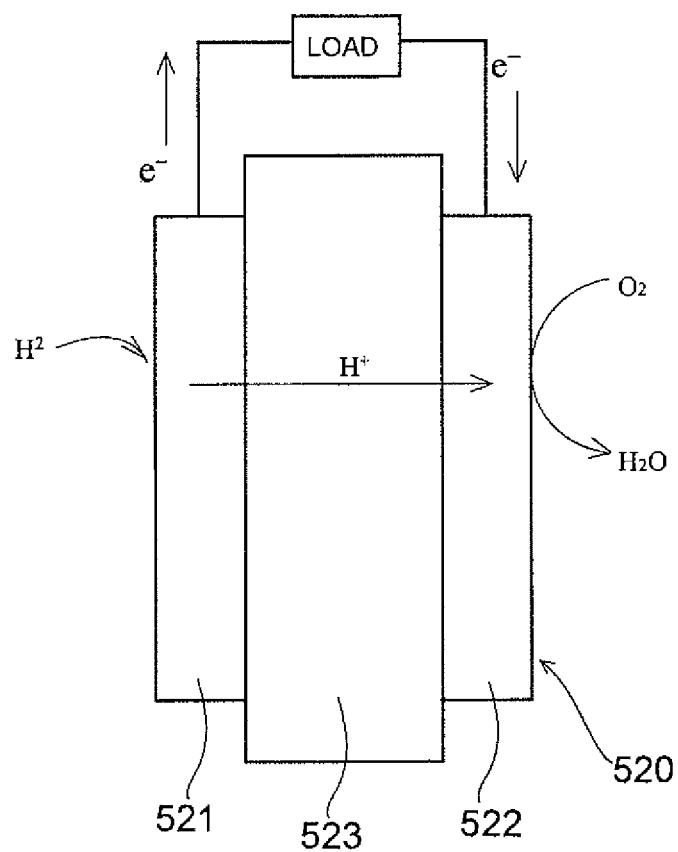
[FIG. 11] is a schematic view showing a reaction mechanism of a fuel cell during power generation.
Figure 12:
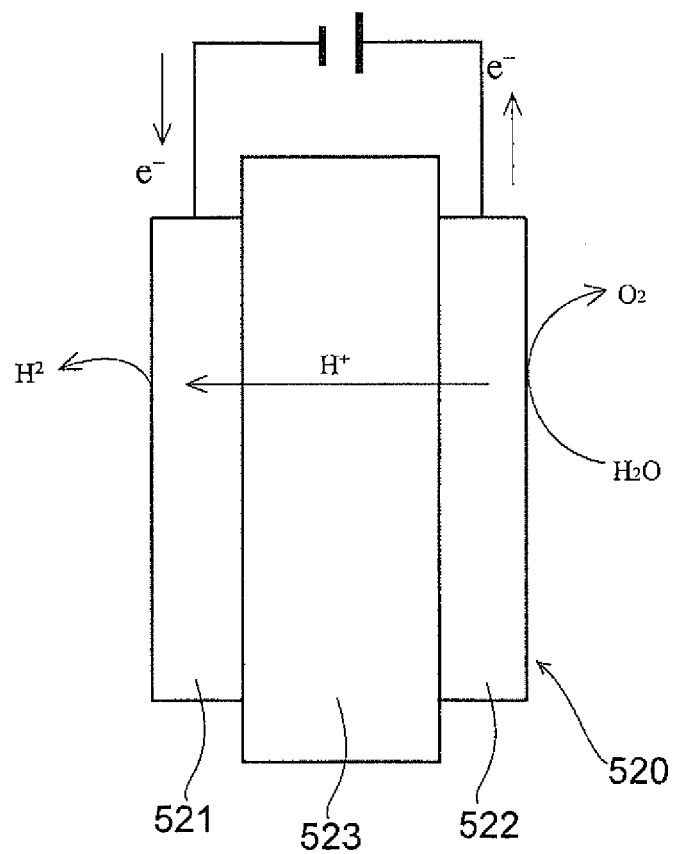
[FIG. 12] is a schematic view showing a reaction mechanism of the fuel cell during charging.

Next, the following describes a fourth embodiment of the fuel cell system according to the present invention with reference to the appended drawings. In the following, duplicate descriptions of components identical to those in the fuel cell systems according to the first to third embodiments are omitted. FIG. 9 is a schematic structural view of a fuel cell system according to the fourth embodiment of the present invention, and FIG. 10 is a schematic view showing a reaction mechanism of the fuel cell system according to the fourth embodiment. A fuel cell system 401 includes a PEFC 420, a reaction container 403, a controller 404, a capacitor 405, a charging power source 415, a hydrogen supply mechanism 407, and a first liquefier tank 440 and a second liquefier tank 443 for storing a gasified hydrogen occlusion material 406.

The reaction container 403 and the PEFC 420 communicate with each other via a hydrogen flow path 408 that is connected to the side of a fuel electrode 421, and a first hydrogen separation membrane 416 is provided on the hydrogen flow path 408. Furthermore, the reaction container 403 and the first liquefier tank 440 communicate with each other via a first flow path 441 and a second flow path 442, with the first flow path 441 branching off from the hydrogen flow path 408 at the first hydrogen separation membrane 416 and communicating with the first liquefier tank 440. Furthermore, the reaction container 403 and the second liquefier tank 443 communicate with each other via a third flow path 444 and a fourth flow path 445. Furthermore, an oxygen supply line 425 is connected to the side of an oxygen electrode 422.

The reaction container 403 and the hydrogen supply mechanism 407 communicate with each other by way of a hydrogen supply line 412, and hydrogen is supplied from the hydrogen supply mechanism 407 into the reaction container 403 via the hydrogen supply line 412. On each of the hydrogen supply line 412 and the oxygen supply line 425, a valve (not shown) is provided, and these valve mechanisms allow hydrogen supply into the reaction container 403 and oxygen supply to the oxygen electrode 422 to be controlled.

Inside the reaction container 403, as the reversible hydrogen occlusion material 406, an organic hydride, $C_6H_{12}$, is provided. Herein, the organic hydride, $C_6H_{12}$, emits hydrogen during power generation and stores hydrogen during charging based on the following reactions.

During power generation: $C_6H_{12}(g) \rightarrow C_6H_6(g) + 3H_2$
During charging: $C_6H_6(g) + 3H_2 \rightarrow C_6H_{12}(g)$ Since these reactions of dehydrogenation and hydrogenation are endothermic reactions that require a relatively high temperature, a temperature adjustment mechanism for heating the inside of the reaction container 403 to a high temperature is required, and to that end, the reaction container 403 is provided with a heater 414. The capacitor 405 is used to provide an external voltage for the heater 414. The capacitor 405 is connected to the charging power source 415 and to the PEFC 420, and part of electricity generated in the PEFC 420 is stored in the capacitor 405.

Furthermore, $C_6H_6$ generated by the dehydrogenation reaction of $C_6H_{12}$ during power generation is in a gasified state and is therefore conveyed together with hydrogen to the hydrogen flow path 408 where $C_6H_6$ is separated from the hydrogen by use of the first hydrogen separation membrane 416, after which $C_6H_6$ passes through the first flow path 441 to be stored in the first liquefier tank 440. Then, during charging, $C_6H_6$ in the first liquefier tank 440 is gasified and supplied in that state into the reaction container 403 via the second flow path 442.

Furthermore, $C_6H_{12}$ generated by the hydrogenation reaction of $C_6H_6$ during charging is also in the form of a gas, and $C_6H_{12}$ generated in the reaction container 403 is supplied to the second liquefier tank 443 via the third flow path 444 and stored in a liquefied state in the second liquefier tank 443. Then, during power generation, $C_6H_{12}$ in the second liquefier tank 443 is gasified and supplied in that state into the reaction container 403 via the fourth flow path 445. By eliminating $C_6H_6$ or $C_6H_{12}$ generated in the reaction container 403 in the above-described manner, the dehydrogenation reaction of $C_6H_{12}$ or the hydrogenation reaction of $C_6H_6$ can be accelerated.

The controller 404 is connected to the heater 414, to the charging power source 415, and to, though not shown, each of the valves on the hydrogen supply line 412, the oxygen supply line 425, the second flow path 442, the third flow path 444, and the fourth flow path 445 and controls an adjustment of heating by the heater 414, driving of the hydrogen supply mechanism 407 by the charging power source 415, and opening and closing of the valves. Specifically, at the time of power generation, the valve on the hydrogen supply line 412 is closed, while the valve on the fourth flow path 445 is opened so that $C_6H_{12}$ in the second liquefier tank 443 is supplied into the reaction container 403, and the inside of the reaction container 403 is heated by the heater 414, so that hydrogen is generated from the hydrogen occlusion material 406. At this time, only hydrogen that has permeated through the first hydrogen separation membrane 416 provided on the hydrogen flow path 408 is supplied to the fuel electrode, while $C_6H_6$ in a gasified state, after being separated from the hydrogen by use of the first hydrogen separation membrane 416, passes through the first flow path 441 to be supplied to the first liquefier tank 440. Meanwhile, at the oxygen electrode 422, oxygen is supplied thereto by opening the valve of the oxygen supply line 425, and by electrochemical reactions at the fuel electrode 421 and at the oxygen electrode 422, the PEFC 420 generates power.

At the time of stopping the power generation, the heating by the heater 414 is stopped, and the supply of the organic hydride into the reaction container 403 is stopped by closing the valve on the fourth flow path 445, while the oxygen supply to the oxygen electrode 422 is stopped by closing the valve on the oxygen supply line 425, so that the electrochemical reactions of the PEFC 420 are stopped.

Furthermore, at the time of charging, with the valve on the hydrogen supply line 412, the valve on the second flow path 442, and the valve on the third flow path 444 opened, the inside of the reaction container 403 is heated by the heater 414, and a voltage is applied from the charging power source 415 to the hydrogen supply mechanism 407. This causes hydrogen to be supplied from the hydrogen supply mechanism 407 through the hydrogen supply line 412 into the reaction container 403 and $C_6H_6$ to be supplied from the first liquefier tank 440 into the reaction container 403, and by the hydrogenation reaction, $C_6H_{12}$ is generated. Then, $C_6H_{12}$ thus generated is supplied to the second liquefier tank 443 via the third flow path 444. These mechanisms of adjusting a temperature and an internal pressure in the reaction container 403 are controlled, and thus hydrogen emission and occlusion by the reversible hydrogen occlusion material 406 are performed stably, thereby allowing charging and discharging of the PEFC 420 to be controlled.

INDUSTRIAL APPLICABILITY

The present invention is favorably applicable as a power source for electronic equipment without any limitation on the form of use thereof.

LIST OF REFERENCE SYMBOLS 101, 201 fuel cell system
103, 203 reaction container
204 controller
205 capacitor
106, 206 hydrogen occlusion material
207 hydrogen supply mechanism
208 hydrogen flow path
109, 209 water flow path
210 gas-liquid separation filter
111, 211 pump
112, 212 hydrogen supply line
113, 213 water discharge line
114, 214 heater
215 charging power source
116, 216 first hydrogen separation membrane 117 water discharging mechanism
218 second hydrogen separation membrane
120, 220 PEFC (fuel cell)
121, 221 fuel electrode
121a fuel diffusion layer
122, 222 oxygen electrode
122a air diffusion layer
123, 223 electrolyte membrane
125, 225 oxygen supply line
124 air chamber
130 circulation path
131 cooling portion
132 water vapor separation membrane
133 oxygen permeable membrane
160 gasifiier
170 cavity
440 first liquefier tank
441 first flow path
442 second flow path
443 second liquefier tank
444 third flow path
445 fourth flow path

The invention claimed is:

1. A reaction container for supplying hydrogen to a fuel cell, said fuel cell having a fuel electrode, an oxygen electrode, and an electrolyte membrane held between the fuel electrode and the oxygen electrode, the fuel cell generating power through a chemical reaction of hydrogen and oxygen and being charged by supply of electricity, comprising:
a hydrogen occlusion material configured to selectively carry out either one of discharge of hydrogen by an oxidation reaction with water supplied by the fuel cell during power generation and occlusion of hydrogen by a reduction reaction with hydrogen during charging; and
a temperature adjuster and an internal pressure adjuster, which are configured to control together the oxidation and reduction reactions of the hydrogen occlusion material,
wherein the temperature adjuster comprises a heating unit configured to heat the hydrogen occlusion material, and the internal pressure adjuster, in a condition that the hydrogen occlusion material is heated by the heating unit, accelerates the oxidation reaction of the hydrogen occlusion material during power generation by restraining discharge of the water supplied from the fuel cell and discharge of the hydrogen produced by the oxidation reaction of the hydrogen occlusion material, and the internal pressure adjuster accelerates the reduction reaction of the hydrogen occlusion material during charging by allowing discharge of the water generated by the reduction reaction of the hydrogen occlusion material and inflow into the reaction container of the hydrogen to be used for the reduction reaction of the hydrogen occlusion material.

2. The reaction container of claim 1, wherein the temperature adjuster controls the oxidation reaction and the reduction reaction of the hydrogen occlusion material by adjusting a temperature of the hydrogen occlusion material by use of the heating unit.

3. The reaction container of claim 1, wherein the temperature adjuster has a heat-insulated structure configured to prevent a decrease in temperature of the hydrogen occlusion material.

4. The reaction container of claim 1, wherein the internal pressure adjuster comprises a valve and a controller, the controller, by opening or closing of the valve, restraining discharge of the water supplied from the fuel cell and the hydrogen produced by oxidation reaction of the hydrogen occlusion material during power generation, and allowing discharge of the water produced by the reduction reaction of the hydrogen occlusion material and inflow into the reaction container of the hydrogen to be used for the reduction reaction of the hydrogen occlusion material.

5. The reaction container of claim 1, wherein the internal pressure adjuster comprises a water discharger capable of discharging water vapor produced by the reduction reaction of the hydrogen occlusion material.

6. The reaction container of claim 5, wherein the water discharger is capable of discharging water produced by cooling water vapor produced by the reduction reaction of the hydrogen occlusion material.

7. The reaction container of claim 5, wherein the water discharger comprises either one of a water vapor separation membrane and a water absorbent, and water vapor having been produced by the reduction reaction of the hydrogen occlusion material is discharged through the water vapor separation membrane or removed by use of the water absorbent.

8. The reaction container of claim 5, wherein the water discharger comprises a water electrolyzer and an oxygen permeable membrane, and discharges oxygen through the oxygen permeable membrane, said oxygen having been produced by decomposition of water vapor by the water electrolyzer, said water vapor having been produced by the reduction reaction of the hydrogen occlusion material.

9. The reaction container of claim 5, wherein the water discharger supplies hydrogen to the hydrogen occlusion material, said hydrogen not having been used in the reduction reaction of the hydrogen occlusion material or remaining after separation or electrolysis of water vapor, said water vapor having been produced by the reduction reaction of the hydrogen occlusion material.

10. The reaction container of claim 5, wherein the water discharger utilizes partial pressure differences of water vapor.

11. The reaction container of claim 1, further comprising a water supply configured to supply water to the reaction container to be used in the oxidization reaction of the hydrogen occlusion material.

12. The reaction container of claim 11, wherein the water supply supplies water vapor to the reaction container, said water vapor having been produced through power generation by the fuel cell.

13. The reaction container of claim 1, further comprising a hydrogen supply configured to produce hydrogen by making use of the water produced by reduction reaction of the hydrogen occlusion material and supply the hydrogen to the hydrogen occlusion material to be used for reduction reaction, and
wherein the internal pressure adjuster, during charging, accelerates the reduction reaction of the hydrogen occlusion material by allowing discharge of the water generated by the reduction reaction of the hydrogen occlusion material and supply of the water to the hydrogen supply to be used for producing hydrogen, and allowing inflow into the reaction container of the hydrogen produced by the hydrogen supply.

14. The reaction container of claim 13, wherein the hydrogen supply supplies hydrogen produced by electrolysis of water vapor to the hydrogen occlusion material, said water vapor having been produced by the reduction reaction of the hydrogen occlusion material.

15. The reaction container of claim 13, wherein the hydrogen supply supplies hydrogen to the hydrogen occlusion material, said hydrogen having been produced by a water decomposition reaction of a photocatalyst.

16. The reaction container of claim 15, wherein a surface plasmon resonance is utilized as a source for exciting the photocatalyst.

17. The reaction container of claim 1, wherein the hydrogen occlusion material comprises at least any one of iron, aluminum, and magnesium.

18. The reaction container of claim 17, wherein the hydrogen occlusion material is prepared through comminution for enlarging a substantial surface area, followed by hydrogen embrittlement resulting in generating microcracks and addition of a sintering material into the microcracks by liquid phase deposition.

19. The reaction container of claim 1, wherein the hydrogen occlusion material comprises any one of an organic hydride, a metallic hydride, a complex hydride, and a carbon material.

20. A fuel cell system comprising the reaction container of claim 1 and the fuel cell, wherein the fuel cell is any one of a solid oxide fuel cell, a polymer electrolyte fuel cell, a phosphoric acid fuel cell, and an alkaline fuel cell.

21. The fuel cell system of claim 20, wherein in the fuel cell, when a negative voltage is applied to the fuel electrode and a positive voltage is applied to the oxygen electrode, reactions reverse to reactions that occur during power generation occur at the fuel electrode and at the oxygen electrode, respectively.

22. A fuel cell system comprising:
a fuel cell having a fuel electrode, an oxygen electrode, and an electrolyte membrane held between the fuel electrode and the oxygen electrode, the fuel cell generating power through a chemical reaction of hydrogen and oxygen and being charged by supply of electricity; and
a reaction container configured to supply hydrogen to the fuel cell,
wherein the reaction container is equipped with:
a hydrogen occlusion material configured to selectively carry out either one of discharge of hydrogen by an oxidation reaction with water produced by power generation and occlusion of hydrogen by a reduction reaction with hydrogen during charging; and
a temperature adjuster and an internal pressure adjuster, which are configured to control together the oxidation and reduction reactions of the hydrogen occlusion material,
wherein the temperature adjuster comprises a heating unit configured to heat the hydrogen occlusion material, and
wherein the internal pressure adjuster, in a condition that the hydrogen occlusion material is heated by the heating unit, accelerates the oxidation reaction of the hydrogen occlusion material during power generation by restraining discharge of the water supplied from the fuel cell and discharge of the hydrogen produced by the oxidation reaction of the hydrogen occlusion material, and the internal pressure adjuster accelerates the reduction reaction of the hydrogen occlusion material during charging by allowing discharge of the water generated by the reduction reaction of the hydrogen occlusion material and inflow of the hydrogen to be used for the reduction reaction of the hydrogen occlusion material.

23. The reaction container of claim 1, wherein the temperature adjuster is capable of increasing temperature and the internal pressure adjuster is capable of decreasing internal pressure to accelerate the reduction reaction of the hydrogen occlusion material.

24. The fuel cell system of claim 22, further comprising a hydrogen supply configured to produce hydrogen by making use of the water produced by the reduction reaction of the hydrogen occlusion material and supply the hydrogen to the hydrogen occlusion material to be used for reduction reaction, and
wherein the internal pressure adjuster, during charging, accelerates the reduction reaction of the hydrogen occlusion material by allowing discharge of the water generated by the reduction reaction of the hydrogen occlusion material and supply of the water to the hydrogen supply to be used for producing hydrogen, and allowing inflow into the reaction container of the hydrogen produced by the hydrogen supply.

* * * * *